Patented Oct. 13, 1953

2,655,496

UNITED STATES PATENT OFFICE 2,655,496

METHOD FOR EMULSIFYING POLYMERIZABLE COMPOUNDS AND EFFECTING POLYMERIZATION WITH THE EMULSIONS

Jack J. Adams, Midland, Mich., assignor to The Dow Chemical Company, Midland, Mich., a corporation of Delaware No Drawing. Application December 22, 1950, Serial No. 202,436

9 Claims. (Cl. 260—85.5)

This invention relates to an improved method for emulsifying liquid polymerizable compounds, and for effecting polymerization of the compounds to form a stable emulsion of the polymer solids.

Polymerization in aqueous emulsion has long been recognized as a particularly advantageous method. It has been customary in preparing the aqueous emulsion of a polymerizable compound to add the compound to water containing the desired amount of emulsifier and then vigorously agitating the mixture so as to form an emulsion wherein water constitutes the continuous phase. The emulsions prepared according to this method have the monomeric polymerizable compound dispersed in globules of appreciable size throughout the water phase. When such an emulsion is polymerized, the resulting "latex" containing the emulsified solid polymer is poor in stability and tends to coagulate easily.

One improved method of forming more stable latices by emulsifying polymerizable compounds has been suggested in U. S. Patent No. 2,479,241. In that method, the emulsions are preferably prepared by mixing with the monomer a concentrated aqueous solution containing more than 0.5 and usually at least 4 per cent as much emulsifier as monomer, so that a jelly-like mass is obtained. Water is then mixed with the jelly under vigorous agitation so as to dilute the mixture to the monomer concentration desired for polymerization. By this second addition of water the jelly is changed into a thin emulsion in which water constitutes the continuous phase.

However, stability is not the only characteristic essential to a good polymer dispersion. It is equally desirable that such a latex when formulated with other coating ingredients, should exhibit a minimum of foaming during its application to surfaces in the form of coatings and paints and in the production of films. Blisters and blemishes commonly occur as a result of foaming during application of the formulated latex by brushing or spraying when the latex employed is prepared by methods known in the prior art. Foaming during application is generally due to the presence of too large an amount of an emulsifier of a certain class in the latex composition. Emulsifiers of the class that are especially effective for the purpose of inverting a water-in-oil (monomer) emulsion to an oil (monomer)-in-water emulsion upon addition of sufficient water, are the ones most likely to cause foaming when present in amounts of 0.5 per cent or more, by weight of monomer. However, with amounts of less than 0.5 per cent, foaming is decreased but stability of the final latex is also decreased. Furthermore, when such small quantities of emulsifier are employed, inversion of the emulsion takes place with some difficulty, often requiring one to two hours of vigorous agitation before inversion occurs.

It is therefore an object of this invention to provide a method of producing stable aqueous dispersions of solid polymers which dispersions exhibit a minimum tendency to foam. Another object is to provide a method of emulsifying polymerizable compounds whereby inversion of the water-in-monomer emulsion to the monomer-in-water emulsion upon addition of sufficient water, occurs immediately on agitation of the emulsion. A further object is to provide a method whereby polymerizable compounds are efficiently and advantageously emulsified to form a stable latex upon polymerization. Other objects will appear hereinafter.

It has been found that the foregoing and related objects may be attained, according to the method of the present invention. The first step of the new method consists in forming a water-in-monomer emulsion by uniformly mixing with agitation, a very small amount of water and of an anionic emulsifier with a predominant proportion of a polymerizable liquid monomer which is substantially immiscible with water. The proportions to be employed are defined hereinafter. When the water-in-monomer emulsion is formed, agitation is interrupted. There is then added to the emulsion sufficient water containing a larger amount of another emulsifier capable of dispersing polymeric solids, so that upon subsequent, vigorous agitation, an aqueous emulsion of the monomer is formed wherein water constitutes the continuous phase. The resulting aqueous emulsion is subjected to the usual polymerizing conditions of time, temperature and catalyst so that liquid monomer therein is converted to solid polymer.

The proportions of water and of anionic emulsifier which are admixed with the monomer in order to obtain a water-in-monomer emulsion, are adjusted to represent an aqueous solution containing at least 5 per cent by weight of the emulsifier. Water-emulsifier ratios representing solutions of about 10 to 60 per cent by weight of the emulsifier, are preferred. The optimum concentration will vary to some extent as determined by the particular emulsifying agent and the nature of the other compounds dissolved in the water phase as well as the particular monomer being emulsified. Any of the various anionic emulsifiers are suitable which are capable of forming water-in-oil type of emulsions, provided they are also capable of inverting such emulsions to the oil-in-water type of emulsion upon addition of sufficient water and subsequent agitation. In forming the water-in-monomer emulsion, about 0.05 to 0.4 per cent, and preferably from 0.1 to 0.15 per cent of the emulsifier, based on the weight of monomer, is generally employed in the aqueous phase.

In the step of adding water to the water-in-monomer emulsion for purposes of inversion, a second emulsifier is present in the water being added, in an amount somewhat larger than that of the first. An amount of about 0.5 to 8 per cent and preferably 4 per cent of the second-stage emulsifier, based on the weight of monomer, is used. The second emulsifier should be one which is capable of effectively dispersing solids formed during polymerization but which is characterized by low foaming tendencies.

The addition of the water solution to the water-in-monomer emulsion may be effected in any suitable manner and in such an amount as to obtain any desired monomer concentration for polymerization purposes. At least a sufficient amount of the water solution of emulsifier is added that upon subsequent agitation, an aqueous emulsion of the monomer is formed wherein water constitutes the continuous phase. The step of discontinuing agitation before the water solution of the second-step emulsifier is added to the water-in-monomer emulsion, is a very critical one in the new process. In comparable experiments, it has been found that surprising, unexpected, and totally different results are obtained when the same quantities of water are added to two identically-prepared water-in-monomer emulsions, containing less than 0.5 per cent of the first-step emulsifier, but wherein one emulsion is agitated vigorously during the addition of water while the other is not agitated until all the water has been added. In the latter method, inversion to a monomer-in-water emulsion occurs immediately, whereas in the method of agitating during the addition of water, inversion may be delayed for as long as 30 to 90 minutes. Thus the method of the present invention effects a significant saving of time. When amounts of the first-step emulsifier are greater than 0.5 per cent by weight of the monomer, the emulsions invert immediately upon adding the water, whether or not agitation has been interrupted, but an undesirable amount of foaming is observed when using the polymer dispersion, due to the presence of too large an amount of the anionic emulsifier introduced in the first step.

The preparation of the water-in-monomer emulsions of the invention is effected without heating, and such normal and convenient temperatures as 10° C. to 30° C. may be used. In those cases where the monomers employed are gaseous at these temperatures, it will be necessary to apply superatmospheric pressures in order to maintain the monomers in liquid phase.

The process of the invention may be applied to preparation of stable emulsions of any substantially water-insoluble polymerizable monoethylenically unsaturated liquid compound. Among representative compounds to which the invention may be applied are one or a mixture of vinyl halides like vinyl chloride; vinyl esters such as vinyl acetate; vinylidene chloride; vinyl aromatic compounds like styrene; acrylate and methacrylate esters; unsaturated nitriles such as acrylonitrile; vinyl ketones such as methyl vinyl or methyl isopropenyl ketone; as well as similar singly olefinic compounds.

The following example is given for the purpose of illustrating the practice of the invention.

*Example*

A 200 gallon kettle was charged with 671.5 pounds of vinylidene chloride, 118.5 pounds of acrylonitrile, and 210 pounds of dibutyl phthalate. The charge was mixed thoroughly with a mechanical stirrer. About 2.5 pounds of a 50 per cent aqueous solution of an anionic emulsifier, which was a petroleum hydrocarbon sodium sulphonate (Alkanol WXN), was added with agitation to form a water-in-oil emulsion with the monomers and plasticizer. Agitation was then discontinued. To the emulsion was added 820 pounds of water containing 30 pounds of the sodium salt of the formaldehyde condensation product of naphthalene sulphonic acid (Daxad 11), 7.9 pounds of a commercial 35 per cent hydrogen peroxide solution, and 110 grams of a 6 per cent ferric nitrate solution. Subsequently agitation of the contents of the kettle was resumed, whereupon inversion occurred with the formation of an oil-in-water type emulsion. Air was displaced in the kettle and polymerization of the monomers proceeded at 45° C. for 22 hours. At the end of this time, the conversion to the copolymer, based on total monomers charged to the system, was about 85 to 90 per cent by weight. The latex product thus formed contained 52.4 per cent solids. The latex appeared to be well dispersed with very little deposition of solid polymer in the polymerization apparatus. The stability of the latex was tested according to the mechanical stability test outlined in A. S. T. M. D-1076-49T employing a Hamilton Beach stirrer. The latex was stirred for 180 minutes before significant coagulation was observed. During the 3 hours of vigorous agitation, no troublesome foaming of the latex was observed.

In contrast, when an emulsion was prepared by stirring all of the water-insoluble constituents into a single aqueous solution containing all of the emulsifying agents, the proportions being those of the preceding example, and the resulting oil-in-water emulsion was polymerized, a latex was formed which deposited at least 4 times as much polymer on the walls of the reaction vessel as did the emulsion of the example. The mechanical stability of the latex was tested in the same manner as the latex above, and coagulation was noticeable in 41 minutes of stirring. Thus, the method of the present invention produced a latex that was more than four times as stable as the one obtained by a method of the prior art.

Other latices were prepared according to the method described in the example, differing only in that more than 0.5 per cent of active portion of Alkanol WXN, based on the weight of monomers, was used to form the water-in-oil type of emulsion. The latices thus obtained, after polymerization, were as stable as that of the example but foamed considerably during the mechanical stability test, or when the emulsions were used in coating operations.

While the invention has been described with respect to the copolymer of vinylidene chloride and acrylonitrile, it may be applied as well to any of the substantially water-insoluble liquid monomers previously identified.

Among the anionic emulsifiers that are useful in forming the water-in-monomer emulsion of the first step of the present process, are those known by the commercial names: Alkanol WXN (a petroleum hydrocarbon sodium sulphonate), Santomerse D (a decyl benzene sodium sulphonate), Duponal ME (a sodium lauryl sulphate), Nacconal HG (an alkyl aryl sulphonate), Aquarex D (a sodium lauryl sulphate), and Aerosol MA (a dihexyl ester of sodium sulphosuccinic acid). When used in amounts sufficient to keep polymer solids in dispersion, these emulsifiers are characterized by a tendency to form emulsions that foam excessively.

Among the emulsifiers that are useful in dispersing polymeric solids in the second step of the present process, are those known by the commercial names: Daxad 11 (a sodium salt of the formaldehyde condensation product of naphthalene sulphonic acid), Oronite (an alkyl aryl sodium sulphonate), Detanol (a sodium salt of an alkyl sulphonate), and Alkanol B (a sodium alkyl naphthalene sulphonate). These emulsifiers are good dispersants of polymeric solids but are poor monomer dispersants and have relatively little tendency toward foam formation in emulsions.

I claim:

1. The method which comprises forming with agitation a uniform mixture of a substantially water-insoluble polymerizable mono-ethylenically unsaturated liquid monomer with about 0.05 to 0.4 per cent, based on the weight of monomer, of an anionic emulsifier, dissolved in sufficient water to form a 5 to 60 per cent solution of the emulsifier, the emulsifier being one which is capable of forming water-in-monomer emulsions and which is incapable at any concentration of maintaining polymer solids in nonfoaming dispersions and being selected from the class consisting of sodium salts of petroleum hydrocarbon sulphonic acids, of decyl benzene sulphonic acids, of lauryl sulphuric acid and of dihexyl esters of sulphosuccinic acid; discontinuing agitation when a water-in-monomer emulsion has formed; adding to the quiescent emulsion sufficient water containing about 0.5 to 8 per cent, based on the weight of monomer, of an emulsifier, of a different type from the first, which is a poor dispersant for liquid monomers but is capable of dispersing polymer solids without significant foaming and is selected from the class consisting of sodium salts of alkyl sulphonic acids, of alkyl naphthalene sulphonic acids, and of formaldehyde condensation products of naphthalene sulphonic acids, so that upon subsequent, vigorous agitation, an aqueous emulsion is formed wherein water is the continuous phase; agitating the mixture to form a monomer-in-water emulsion; and subjecting the resulting aqueous emulsion to polymerizing conditions to convert the liquid monomer to solid polymer.

2. The method as claimed in claim 1 wherein the polymerizable monomer comprises vinylidene chloride.

3. The method as claimed in claim 1 wherein the polymerizable liquid compound is a mixture of vinylidene chloride and acrylonitrile.

4. The method as claimed in claim 1 wherein there is employed about 0.1 to 0.15 per cent, based on the weight of monomer, of the anionic emulsifier, capable of forming the water-in-monomer emulsion.

5. The method as claimed in claim 1 wherein there is employed about 4 per cent, based on the weight of monomer, of the emulsifier capable of dispersing polymeric solids.

6. The method which comprises forming with agitation a uniform monomeric mixture of 85 per cent vinylidene chloride and 15 per cent acrylonitrile with about 0.1 to 0.15 per cent, based on the weight of monomers, of an anionic emulsifier in the form of a 10 to 60 per cent aqueous solution, the emulsifier being one which is capable of forming water-in-monomer emulsions and which is incapable at any concentration of maintaining polymer solids in non-foaming dispersions and being selected from the class consisting of sodium salts of petroleum hydrocarbon sulphonic acids, of decyl benzene sulphonic acids, of lauryl sulfuric acid and of dihexyl esters of sulphosuccinic acid; discontinuing agitation when a water-in-monomer emulsion has formed; adding to the quiescent emulsion sufficient water containing about 4 per cent, based on the weight of monomer, of an emulsifier of a different type from the first, which is a poor dispersant for liquid monomer but is capable of dispersing polymer solids without significant foaming and is selected from the class consisting of sodium salts of alkyl sulphonic acids, of alkyl napthalene sulphonic acids and of formaldehyde condensation products of naphthalene sulphonic acids, so that upon subsequent, vigorous agitation, an aqueous emulsion is formed wherein water is the continuous phase; agitating the mixture to form a monomer-in-water emulsion; and subjecting the resulting aqueous emulsion to polymerizing conditions to convert the liquid monomers to a solid vinylidene chloride-acrylonitrile copolymer.

7. The method as claimed in claim 6 wherein the anionic emulsifier employed in making the water-in-monomer emulsion is the sodium salt of a petroleum hydrocarbon sulphonate.

8. The method as claimed in claim 6 wherein the emulsifier, capable of dispersing polymeric solids, is the sodium salt of the formaldehyde condensation product of naphthalene sulphonic acid.

9. The method as claimed in claim 6 wherein the anionic emulsifier employed in making the water-in-monomer emulsion is the sodium salt of a petroleum hydrocarbon sulphonate and the emulsifier capable of dispersing polymeric solids is the sodium salt of the formaldehyde condensation product of naphthalene sulphonic acid.

JACK J. ADAMS.

References Cited in the file of this patent

UNITED STATES PATENTS

| Number | Name | Date |
|---|---|---|
| 2,479,241 | Kolvoort et al. | Aug. 16, 1949 |